United States Patent [19]

Marier

[11] Patent Number: 4,591,173
[45] Date of Patent: May 27, 1986

[54] SUSPENSION AND STEERING MECHANISM FOR A SNOWMOBILE

[75] Inventor: Gregory J. Marier, Brooklyn Park, Minn.

[73] Assignee: Yamaha Hatsudoki Kabushiki Kaisha, Iwata, Japan

[21] Appl. No.: 653,291

[22] Filed: Sep. 24, 1984

[51] Int. Cl.$^4$ .............................................. B62B 17/04
[52] U.S. Cl. .................................... 280/21 R; 180/190
[58] Field of Search ...................... 280/16, 21 R, 21 A, 280/25, 26, 27; 180/190

[56] References Cited

U.S. PATENT DOCUMENTS 3,982,597 9/1976 Callaway .......................... 280/21 A
4,364,447 12/1983 Yoshida ............................ 280/21 R Primary Examiner—David M. Mitchell
Attorney, Agent, or Firm—Orrin M. Haugen; Thomas J. Nikolai

[57] ABSTRACT

An improved steering and suspension mechanism for a snowmobile. A tubular sleeve is fixed to the frame of the snowmobile in a generally vertical orientation, and a strut having a portion thereof held within the tubular sleeve is arranged so that it is both rotatably and axially movable. At least one steering ski is attached to the lower end of the strut and a steering arm is disposed coaxially with the strut and made to be swingable about the axis of the strut upon actuation of a steering handle. A connecting arm joins to the steering arm in a vertically movable manner and means are provided for securing the lower end of the connecting arm to the steering skis in a longitudinally slidable manner.

6 Claims, 8 Drawing Figures

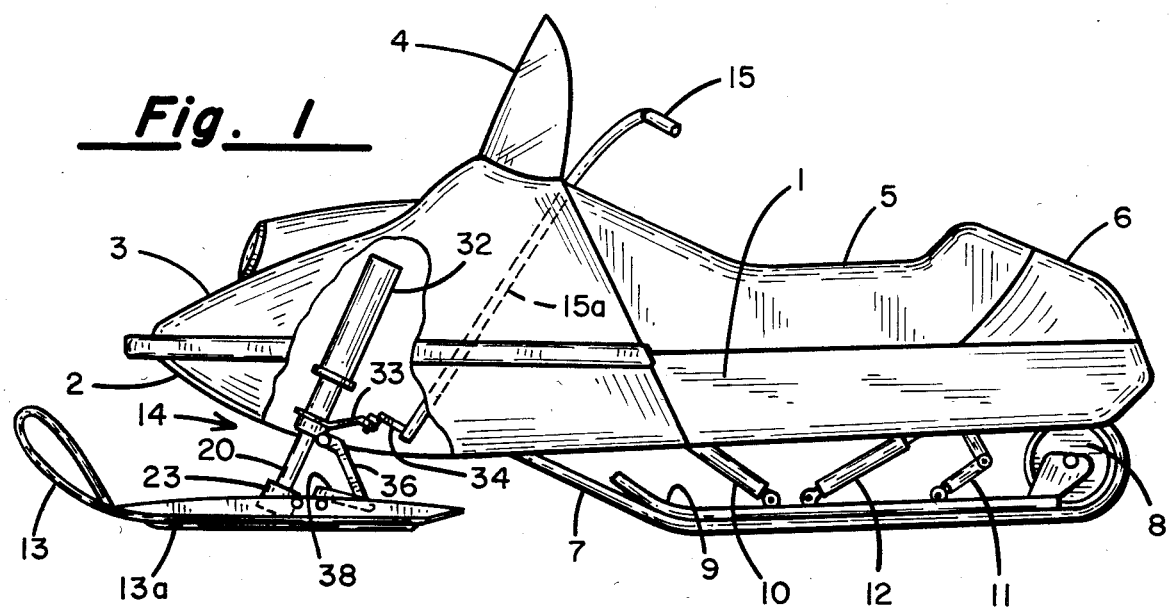
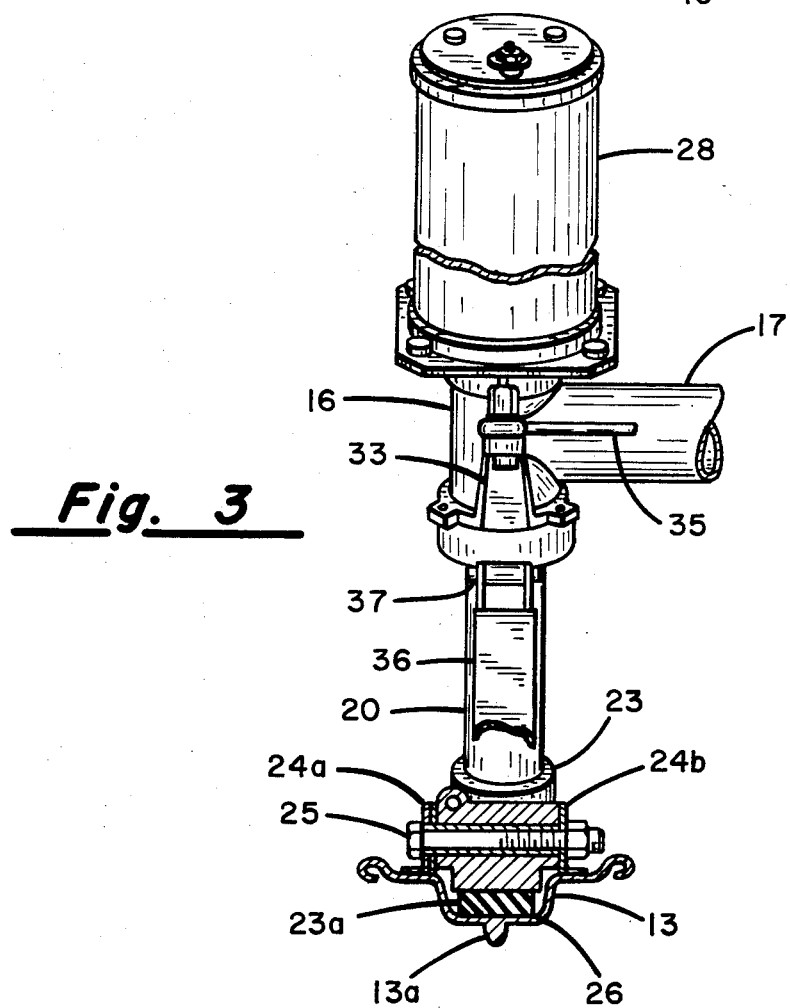

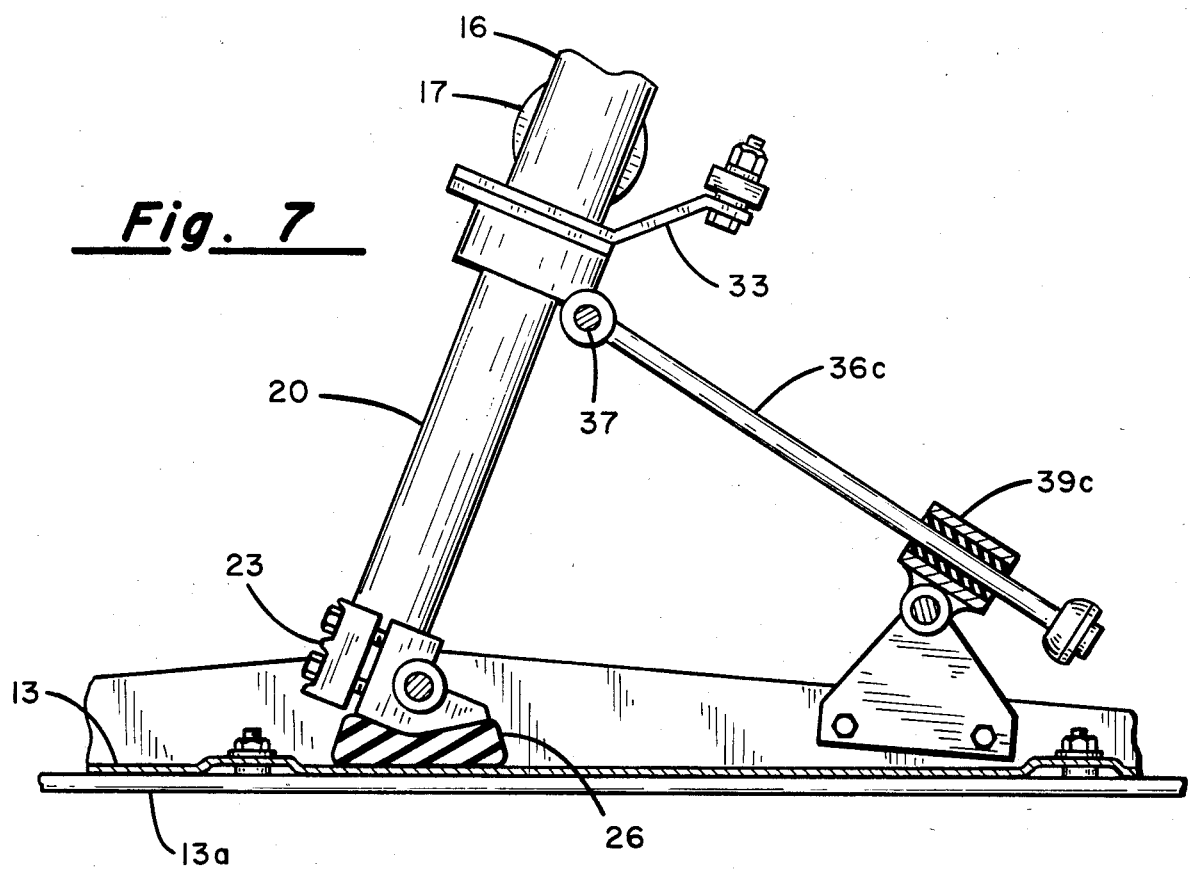
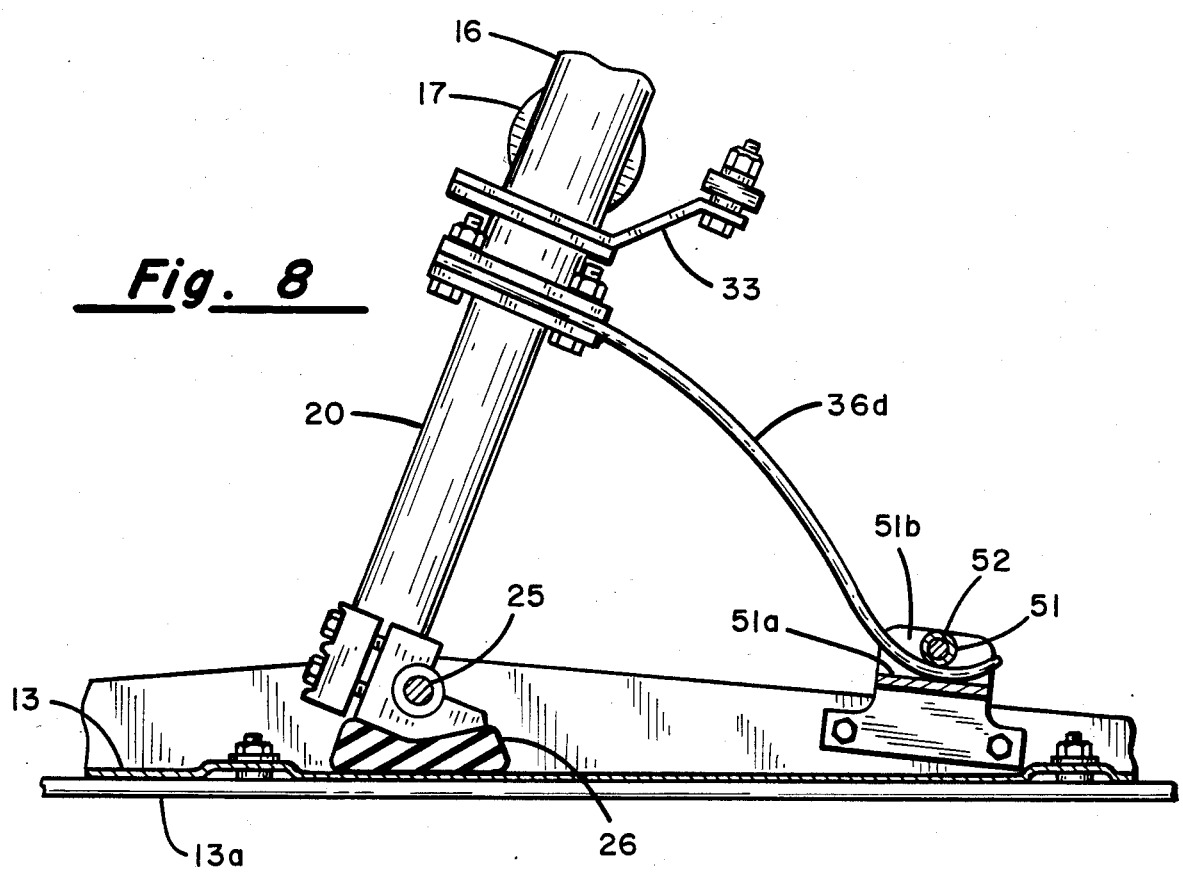

SUSPENSION AND STEERING MECHANISM FOR A SNOWMOBILE

BACKGROUND OF THE INVENTION

The present invention relates generally to snowmobiles, and more particularly to an improved suspension and steering mechanism for snowmobiles.

The prior art does describe a variety of steering and suspension mechanisms for snowmobiles. (See, for example, U.S. Pat. No. 4,364,447.) The suspension and steering designs described in the prior art, however, all have either more parts or parts which are more difficult to machine than those found in the design of the present invention. Thus, the manufacture of the prior art designs to the precise tolerances necessary to render them effective makes them far more expensive than the present invention.

SUMMARY OF THE INVENTION

Briefly, the suspension and steering mechanism of the present invention includes a strut held rotatably within a sleeve that is fixed to a frame; a steering ski attached to the lower end of the strut; a compression spring sandwiched between the strut and the frame; a steering arm disposed coaxially with the strut and made swingable in association with the steering handle; and a connecting arm having an upper end connected to the steering arm in a vertically movable manner and its lower end connected to the steering ski in a longitudinally slidable manner.

Accordingly, a primer object of the present invention is to provide a new and improved suspension and steering mechanism for a snowmobile which enhances the maneuverability of the machine.

Another object of the invention is to provide an improved apparatus which enhances the comfort of those riding on the snowmobile.

Still another object of the present invention is to provide a new and improved steering and suspension mechanism which increases the stability of the snowmobile at a reduced cost.

The present invention and many of the attendant objects and advantages thereof will be readily appreciated as the same become better understood by reference to the following detailed desription when considered in connection with the accompanying drawings in which like numerals in the several views refer to corresponding parts.

DESCRIPTION OF THE DRAWINGS

FIG. 1 is a side elevation of one embodiment of the improved suspension and steering mechanism shown in assembled relation with a snowmobile;

FIG. 3 is a section taken along lines III—III of FIG. 2;

FIG. 7 is a side elevation showing a third alternative embodiment; and

FIG. 8 is a side elevation showing a fourth alternative embodiment.

DESCRIPTION OF PREFERRED EMBODIMENT

Figure 2:
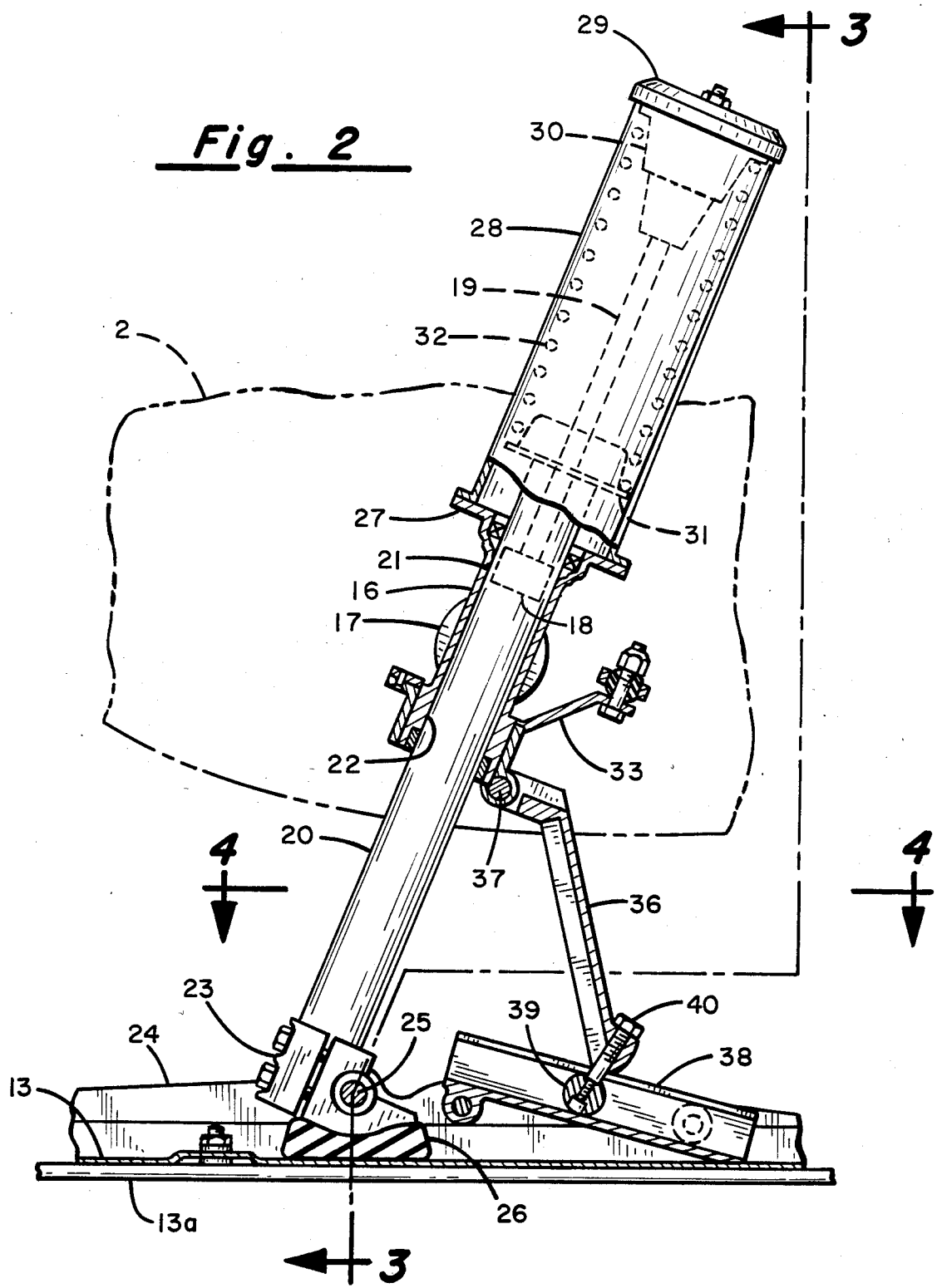
FIG. 2 is a sectional side elevation showing, in detail, the first embodiment of the invention.

As stated above, FIG. 1 shows the preferred embodiment of invention in assembled relation with a snowmobile. The snowmobile has a frame 1, a shield 2 which covers the front of the frame 1 from the bottom; a shroud or cowl 3 which covers the front of the frame 1 from the top; a windshield 4; a rider's seat 5; an accessory box 6; an endless track 7; guide wheels 8 for tensioning the track 7; a slide rail 9 which is attached to the frame 1 through links 10 and 11; a shock absorber 12; and a pair of steering skis 13, only one of which is shown. The steering skis 13 are held resiliently in the vertical direction by means of a later-described suspension, indicated generally by numeral 14, and can be steered to the right and left by means of a steering handle 15.

A major component of the suspension 14 is sleeve 16 (FIG. 2) which is fixed to the forwardly extending portion of the frame 1 in a manner to be described with greater particularity below. More specifically, sleeve 16 is fixed to the two ends of the transversely extending cylindrical cross member 17.

Figure 4:
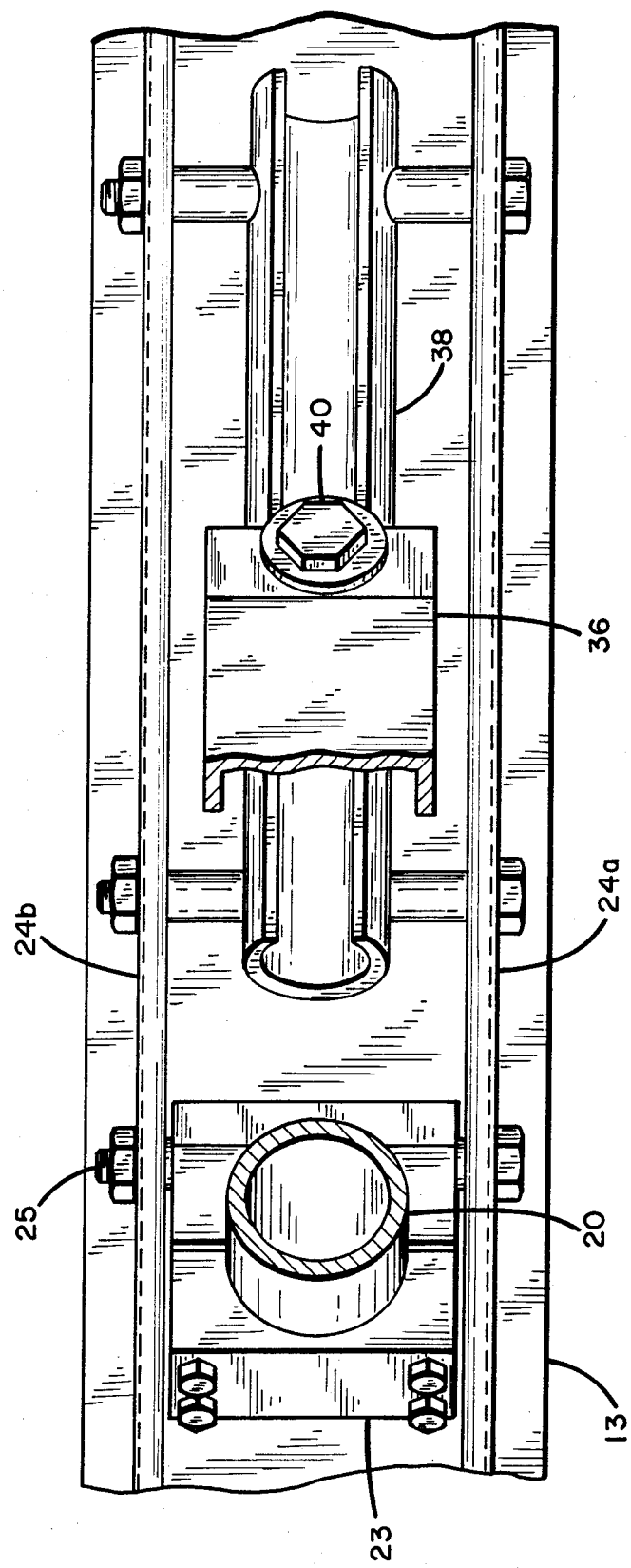
FIG. 4 is a section taken along lines IV—IV of FIG. 2.

As best shown in FIGS. 2-4, sleeve 16 axially and rotationally retains cylindrical strut 20 which is essentially a component of a hydraulic shock absorber having piston 18, piston rod 19 and sleeve bearings 21 and 22. To achieve this retaining function, sleeve 16 has an upper end formed integrally with a flange 27, to which a tubular cylinder 28 is fixed. The tubular cylinder 28 is crowned with a cover 29 which rotatably maintains the upper end of piston rod 19 in the appropriate position. Also, attached to the lower surface of cover 29 is a spring seat 30 which is made rotatable together with a piston rod 19. At the upper end of strut 20 and located within cylinder 28 is a spring seat 31. A compression spring 32 is sandwiched between spring seats 30 and 31. In this configuration, since seat 30 is supported by the frame 1 (through the cover 29, the cylinder 28 and sleeve 16 and the cross number 17) and seat 31 is supported by strut 20, the compression spring 32 causes strut 20 and of the frame 1 to oppose each other.

Attached in a vertically swinging manner to the lower end of strut 20 are the steering skis 13. To achieve this vertically swinging attachment, bracket 23 is fixed to the lower end of strut 20. The bracket 23 is also hingedly secured between the two upright walls 24a and 24b (FIG. 4) of the skis 13 by means of a hinge pin 25. Further, the bracket 23 has its lower face 23a projecting downward, and a resilient, elastic member 26 is sandwiched between the that lower face of 23a and the ski 13. As a result, the ski 13 is biased to return to its generally horizontal position once various operating forces are removed.

To transmit steering forces from the steering bar 15 to the skis 13, a steering arm 33 is held swingably on the circumference of the lower end of sleeve 16. The steering arm 33 extends upward and backward when viewed as in FIG. 2. To the lower end of steering shaft 15a of the steering handle 15, there is fixed a pitman arm 34 which has its swinging end connected to the swinging end of the steering arm 33 by means of tie rod 35. Further, connecting arm 36 is attached to steering arm 33 by means of hinge pin 37 which is directed at a right angle with respect to strut 20. In this configuration, connecting arm 36 is allowed to swing around the strut 20, together with a steering arm 33 in a vertical direction. The other end of connecting arm 36 is fixed by means of a bolt 40 to a spherical sliding block 39 which is in slidable engagement with guide rail 38 of the steering ski 13.

When in use, the direction of the snowmobile may be changed by moving steering handle 15 to the right or left. When the steering handle 15 is turned, the steering arm 33 and the connecting arm 36 arm are swung through the pitman arm 34 and the tie rod 35. The swinging motions of the connecting arm 36 is transmitted to the steering skis 13 through bolt 40, the sliding block 39 and guide rail 38. The skis turn to the right or left together with strut 20, piston rod 19 and compression spring 32.

Further, as undulations in the snow surface are encountered, the steering skis 13 move up and down together with strut 20. The shock is absorbed because strut 20 is held vertically movable in the sleeve 16 and has its upper end supported resiliently by the compression spring 32. Steering is easily controlled even when bumps are encountered because the connecting arm 36 has its upper end swinging up and down on the hinge pin 37 and its lower end sliding along the guide rail 38 so that the changes in distance between the steering arm 33 and ski 13 are absorbed according to the vertical motions of the ski 13.

As those skilled in the art will readily recognize, the present invention will be cheaper to build and tolerances will be more easily conformed to because the mechanism of the present invention uses a slide joint and thus has fewer hinge joints than do prior art designs.

Figure 5:
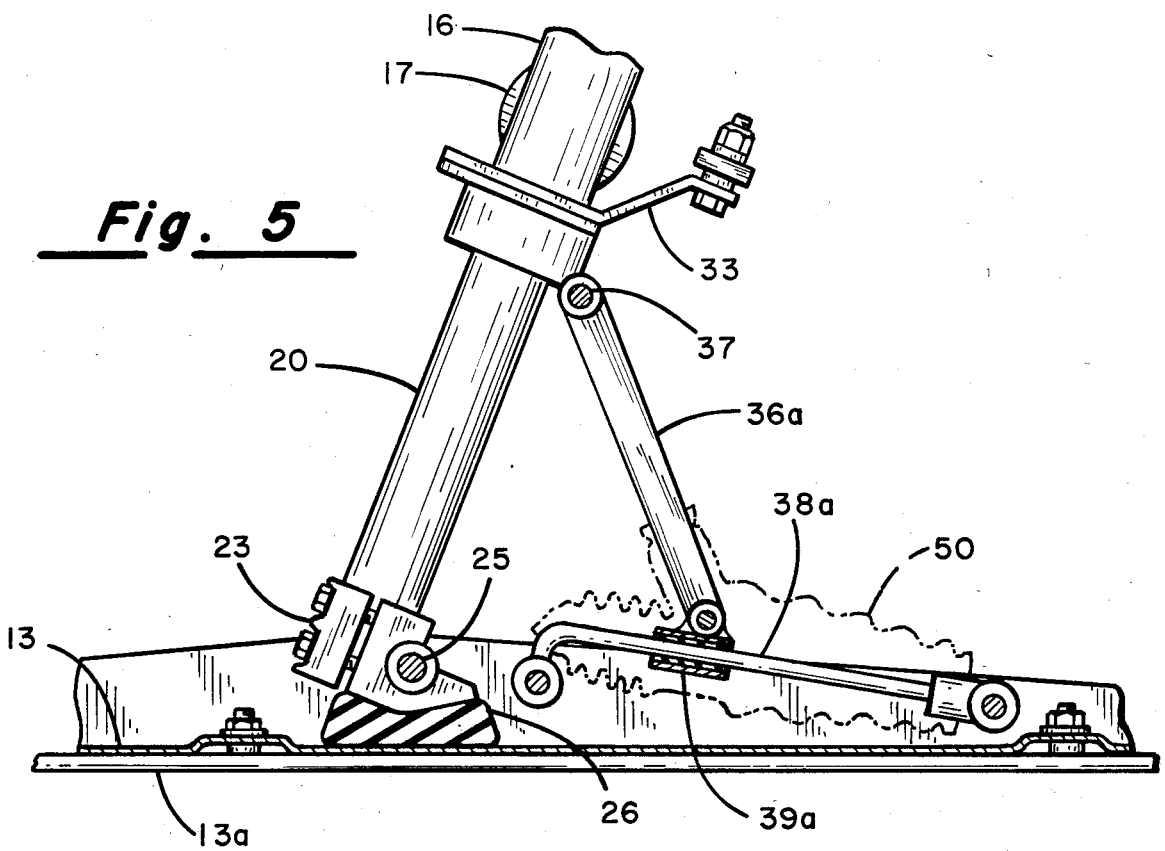
FIG. 5 is a side elevation showing a first alternative embodiment.

Turning now to FIG. 5, shown as a first alternative embodiment in which a guide rail 38a, a sliding block 39a and bellows boot 50 are incorporated. Guide rail 38a is in the form of a rod having a circular cross-section. Sliding block 39a is formed into a cylindrical shape and is hinged to the lower end of connecting arm 36a. The lower portions of connecting arm 36a and guide rail 38a are covered with the bellows boot 50 which is made of rubber to protect guide rail 38a against ice or snow which could interfere with the desired sliding action.

Figure 6:
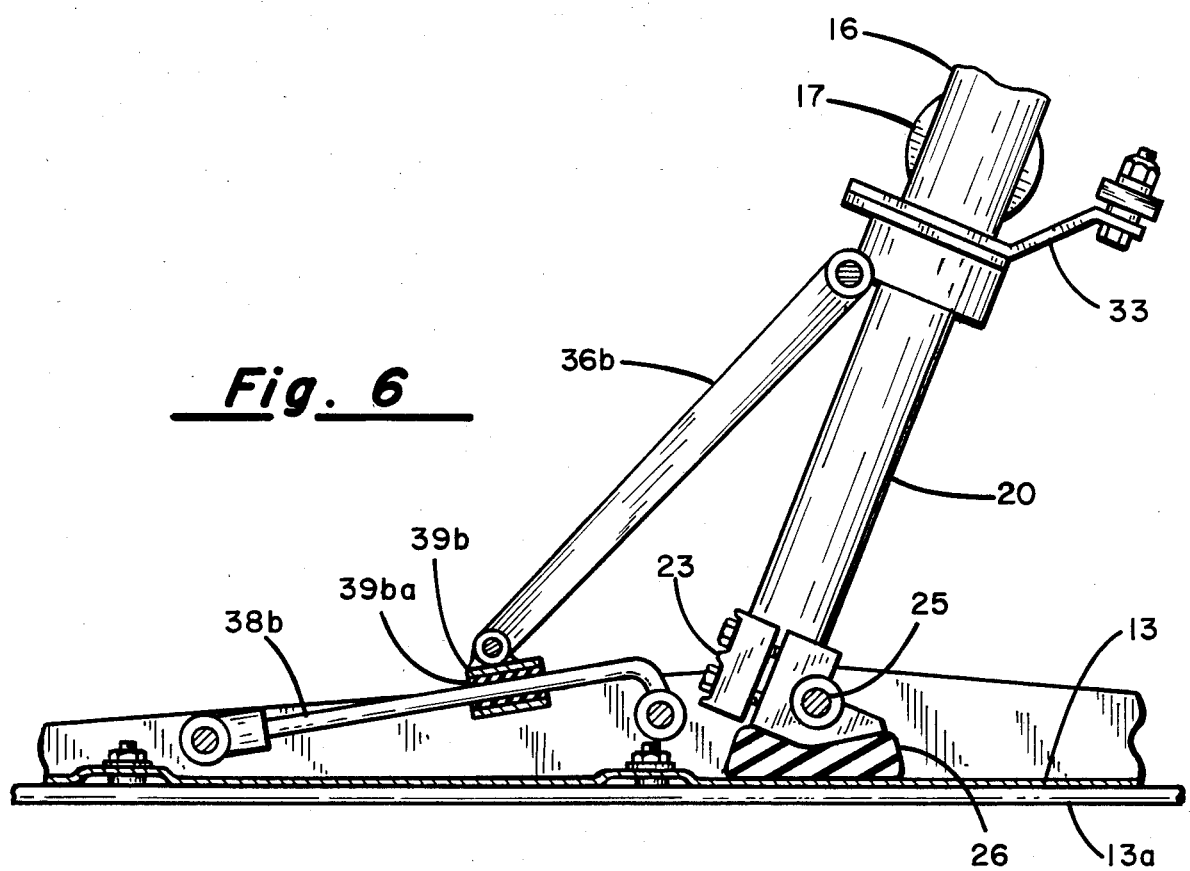
FIG. 6 is a side elevation showing a second alternative embodiment.

Shown in FIG. 6 is a second alternative embodiment. In this embodiment, a cylindrical sliding block 39b and a connecting arm 36b are arranged in front of a strut 20b rather than in the rear as in the previously described embodiment. It is desirable that the guide rail 38b and the bushing of the sliding block 39b be made or coated of a deicing synthetic resin or else contained within a bellows boot.

Shown in FIG. 7 is a third alternative embodiment in which a connecting arm 36c comprises a cylindrical rod and sliding block 39c is hingedly attached to steering ski 13c by a bracket so that the connecting arm 36c is in slidable engagement with slide block 39c. In this configuration, the connecting arm 36c acts as the guide rail for the slide assembly.

FIG. 8 shows a fourth alternative embodiment to the present invention. In this embodiment, the connecting arm 36d is constructed as a leaf spring which can warp in a vertical direction. Connecting arm 36d has its upper end joined rigidly to a steering arm 33 and its lower end butted slidably against a spring bearing 51 which is fixed on the steering ski 13. The spring bearing 51 is formed with both a sliding face 51a against which abuts the lower face of the lower end of connecting arm 36d, and a pair of right and left sidewalls 51b (only one of which is shown) which confine the two right and left edges of the connecting arm 36d against lateral motion. The lower end of the connecting arm 36d is prevented from leaving the spring bearing 51 by means of a bolt 52 which is screwed across the two sidewalls 51b.

In the embodiment shown in FIG. 8, the swing motions of the steering arm 33 are transmitted to the steering skis 13 by only one slide joint without any use of the pin joint. As a result, the response is that the steering handle is further improved. When the steering skis 13 move up and down in response to undulations of the snow surface, the spring force of the connecting arm 36b acts to return the steering skis 13 to their horizontal positions.

From the foregoing, it could be seen that applicant has provided a steering and suspension mechanism which could significantly decrease the overall costs of the snowmobile while improving the snowmobile's responsiveness. While the invention is susceptible to various modifications and alternative constructions, certain illustrative embodiments thereof have been shown in the drawings and described in detail. It should be understood, however, that there is no intention to limit the invention to the specific forms disclosed but, on the contrary, the invention is to cover all modifications, alternative constructions and equivalents falling within the spirit and scope of the invention.

What is claimed is:

1. A steering and suspension mechanism for a snowmobile comprising:
    (a) tubular sleeve means affixed to the frame of said snowmobile in a generally vertical orientation;
    (b) a strut having a portion thereof held within said tubular sleeve means so that it is both rotatably and axially movable;
    (c) at least one steering ski attached to the lower end of said strut;
    (d) a steering arm disposed coaxially with said strut and made swingable about said strut in association with a steering handle;
    (e) a connecting arm;
    (f) means for pivotally securing one end of the connecting arm to said steering arm for permitting movement of said connecting arm in a generally vertical plane relative to said steering arm;
    (g) a guide rail attached to said steering ski;
    (h) a sliding member in slidable engagement with said guide rail; and
    (i) means securing said connecting arm to said sliding member whereby the lower end of said connecting arm is secured to said steering ski in a longitudinally slidable manner.

2. The steering and suspension system as in claim 1 wherein said guide rail is tubular and includes a longitudinal slit extending through the side wall thereof and said sliding member is spherical and of a diameter to be slidingly received in the lumen of said tubular guide member.

3. The steering and suspension mechanism of claim 1 wherein said strut is comprised of:
    a. a piston;
    b. a piston rod coupled to said piston;
    c. a first spring seat affixed to said frame and rotatably receiving one end of said piston rod;
    d. a second spring seat attached to the piston rod and spaced from said first spring seat; and e. a compression spring sandwiched between said first and second spring seats.

4. The steering and suspension mechanism of claim 1 and further including a bellows boot surrounding said sliding member and guide rail to prevent accumulation of ice and snow on said guide rail.

5. The steering and suspension mechanism of claim 1 in which the guide rail comprises a rod having a circular cross-section and the sliding member has a cylindrical shaped interior for receiving at least a portion of said rod.

6. The steering and suspension mechanism of claim 1 wherein said means for attaching at least one steering ski to the strut include:
- a. two spaced apart upright walls on the steering ski;
- b. bracket means fixed to the lower end of said strut and hingedly secured between two upright walls of said steering ski; and
- b. a resilient elastic member sandwiched between the lower portion of the bracket and said ski.

* * * * *